United States Patent [19]
Mraz

[11] Patent Number: 5,140,823
[45] Date of Patent: Aug. 25, 1992

[54] CRYOSTAT

[75] Inventor: Beat Mraz, Hombrechtikon, Switzerland

[73] Assignee: Spectrospin AG, Fallanden, Switzerland

[21] Appl. No.: 521,732

[22] Filed: May 10, 1990

[30] Foreign Application Priority Data

May 12, 1989 [DE] Fed. Rep. of Germany ....... 3915578

[51] Int. Cl.$^5$ .............................................. F25D 3/10
[52] U.S. Cl. ...................................... 62/51.1; 62/45.1
[58] Field of Search ....................... 62/51.1, 45.1, 297; 505/892

[56] References Cited

U.S. PATENT DOCUMENTS

| | | | |
|---|---|---|---|
| 3,328,229 | 6/1967 | Windecker | 161/143 |
| 4,300,354 | 11/1981 | Buchs et al. | 62/45.1 |
| 4,483,904 | 11/1984 | Church | 428/543 |
| 4,781,034 | 11/1988 | Nicol et al. | 62/51.1 |
| 4,848,103 | 7/1989 | Pelc et al. | 62/45.1 |
| 4,878,351 | 11/1989 | Weber et al. | 62/51.1 |

FOREIGN PATENT DOCUMENTS

| | | |
|---|---|---|
| 0304596 | 7/1988 | European Pat. Off. . |
| 3915578 | 11/1990 | Fed. Rep. of Germany . |
| 1472691 | 3/1966 | France . |
| 2344392 | 3/1977 | France . |
| 0083597 | 4/1987 | Japan ............................. 62/45.1 |
| WO86/04016 | 1/1986 | PCT Int'l Appl. . |
| 571267 | 12/1975 | Switzerland . |
| 640973 | 1/1984 | Switzerland . |

OTHER PUBLICATIONS

Proceedings of the Tenth International Cryogenic Engineering Conference (ICEC) Helsinki, Finland, Jul.-/Aug. 1984, pp. 197 and 200.

Primary Examiner—Albert J. Makay
Assistant Examiner—William C. Doerrler
Attorney, Agent, or Firm—Cohn, Powell & Hind

[57] ABSTRACT

A cryostat, in particular for superconductive magnets, comprising different components nested in each other, one of them forming an outer shell and at least another one forming a tank arranged in the latter for receiving a coolant, and comprising further tension bars for interconnecting each inner component with its respective adjacent outer component, the said tension bars containing reinforcing fibers and being equipped at their ends with tie rods by means of which they are fixed to the respective component. A bond of high strength is achieved between the tension bars and tie rods due to the fact that the tie rods are provided with an outwardly widening bore, that each end of each tension bar is arranged in the bore in such a manner that the ends of the reinforcing fibers, being spread apart and impregnated with a glue, are located at the wider end of the bore. The widening tension bars, which are passed through the tie rods, have the effect that the connection is subjected, preferably, to pressure and shearing forces, whereby the tensile strength is prevented from dropping suddenly if the breaking tension should be exceeded.

15 Claims, 5 Drawing Sheets

CRYOSTAT

BACKGROUND OF THE INVENTION

The present invention relates to a cryostat, in particular for superconductive magnets, comprising different components nested in each other, one of them forming an outer shell and at least another one forming a tank arranged in the latter for receiving a coolant, and comprising further tension means for interconnecting each inner component with its respective adjacent outer component, the said tension means containing glass fibers or aramide fibers and being equipped at their ends with tie rods by means of which they are fixed to the respective component, the ends of the tension means consisting of glass fibers or aramide fibers and being fixed in a conical bore arranged in the tie rod. Further, the invention relates to a method for producing tension means of this kind.

In the case of cryostats for superconductive magnets of the general structure described before, particular problems are encountered in connection with the construction of the tension means which normally are designed as tension bars. Such tension bars must exhibit high tensile strength, in order to be able to safely carry the relatively important masses, and at the same time low thermal conductivity in order to keep the heat transmission to the interior of the cryostat as low as possible. Further, they should be easy to produce and to assemble and require a minimum of space in the cryostat because the spaces required for accommodating them may considerably increase the overall volume of such a cryostat.

There have been known plastic rods (WO 86/04016) which are reinforced by directional glass fibers. Such tension bars provide the advantage that they offer the required tensile strength without, however, requiring too much space in the cryostat. The ends of such tension bars are provided with tie rods through which the forces are introduced. An intimate connection between the tension bar and the tie rod is achieved by the fact that the glass fibers are formed to a loop at the end of the plastic rod and that the loop projects from the end of the plastic bar. The tie rod is provided with a conically widening bore, and the end of the tension bar is passed through such bore in such a manner that the glass fiber loop projects beyond the wider end of the bore. Now, a wedge is introduced into the projecting loop, the glass fibers and the wedge enclosed by them are pulled into the bore, which gets narrower in the direction of tension, and the glass fibers are finally cured in this position.

This high-strength connection between the tie rod and the tension bar is connected, however, with the disadvantage that the ends of the tension bars must be provided with glass-fiber loops which not only is rather cost-intensive, but requires in addition considerable input as a plurality of tension bars of different lengths are used in a cryostat so that a special tension bar with the described loops formed on its ends has to be produced for every such length. The different materials of the tie rod, the wedge and the plastic rod create the additional disadvantage that due to the different coefficients of expansion it is not possible to achieve a reliable surface bond between the tension bar and the tie rod so that this connection offers only limited security from failure.

SUMMARY OF THE INVENTION

Now, it is the object of the present invention to provide tension means for cryostats which can be produced in a simple and low-cost manner, with close tolerances, and which require only little space while at the same time offering higher security from failure.

The device according to the invention attains this object by the fact that the ends of the glass fibers or aramide fibers forming the ends of the tension means end at the end of the tension means and are fixed, spread in fanlike manner, in the bores of the tie rod, for example by gluing.

According to the invention, the tension means are equipped with tie rods which are provided with a bore widening to one side. The ends of the tension means, which consist of directional glass fibers, are spread in fanlike manner so that the end of the tension means exhibits a larger cross-sectional surface than the remaining body of the tension means, and the ends are provided with an adhesive surrounding and enclosing each individual glass fiber. Finally, the tension means is arranged in the tie rod in such a way that it projects through the bore provided in the latter and that the ends of the glass fibers which are spread in fanlike manner and impregnated with the adhesive are positioned in the enlarged end of the bore. After curing of the adhesive, very high tensile forces can be transmitted to the tension means, via the tie rod, thanks to the large bonding area and the direct bond between the adhesive and the glass fiber ends. When loaded in this manner, the adhesive is subjected to shearing and pressure forces so that the adhesive is squeezed between the fibers because the traction force exerted by the tension means acts in the direction of the narrower end of the bore of the tie rod so that it tends to displace the adhesive. Even if the bond between the tie rod and the tension means should be damaged, the latter is still capable of transmitting forces as the adhesive is prevented from being displaced from the space between the fibers due to its self-locking effect. Consequently, the bond will continue to safely transmit traction forces even after the breaking tension, has been exceeded due to peak loads. Advantageously, the tension means is made from a plastic material and reinforced by unidirectional or bidirectional glass fibers.

According to a particularly advantageous embodiment of the tension means containing glass fibers, the tension means are designed as circular plastic bars which are reinforced by unidirectional glass fibers. Such glass fiber reinforced plastic rods are available on the market as mass products which only have to be cut to the desired length and to be stripped at their ends from the synthetic resin enclosing the glass fibers so that the latter can be spread in fanlike manner, after the plastic bar has been introduced into the bore, and can then be provided with an adhesive. Preferably, the narrower end of the bore has a cross-section matching the cross-section of the plastic bar.

According to another advantageous embodiment of the invention, the tension means are designed as Kevlar polyaramide strings. These Kevlar polyarimide strings, which consist of aramide fibers, are also capable of transmitting very high tensile forces and provide the advantage that they do not require any pretreatment before being connected to the tie rod. The Kevlar polyaramide string is merely introduced into the tie rod, through the narrower end of its bore, until it comes to project beyond the wider end of the bore. Once the projecting ends of the aramide fibers have been spread, and adhesive has been added, the projecting end of the string is retracted into the bore of the tie rod, and the adhesive is permitted to cure in this position.

As has been mentioned before, the amount of heat which is transmitted by the tension means must be kept as small as possible. The heat transmission is determined not only by the thermal conductivity of the tension means, but also by the heat transmission to the tension means from the components to which the tension means is fixed. Regarded under this aspect, the tension means employed by the cryostat according to the invention provides the advantage that due to the small thickness of the tension means the contact surface between the latter and the tie rods mounted thereon is relatively small so that the heat transmission due to thermal conduction remains relatively unimportant. In spite of the small thickness of the tension means, their tensile strength is, advantageously, sufficiently high.

According to a preferred embodiment of the invention, the tie rod is provided with a bore widening conically towards one opening thereof. According to another advantageous embodiment of the invention, the bore of the tie rod is cylindrical in shape over a first portion and widens up conically over the remaining portion. The cylindrical portion of the bore may be adapted to the cross-section of the tension means, whereas the conically widening portion is designed in such a manner that it fully accommodates the ends of the directional glass fibers after they have been spread and embedded in adhesive. Preferably, the portion of the tension means adjacent the spread-up end, which is enclosed by the cylindrical portion of the bore of the tie rod, may also be glued into the latter. When the tension means is subjected to traction forces, this will then give rise to shearing forces between the tension means and the tie rod in the cylindrical portion and to pressure and shearing forces in the conically widening portion of the bore. This provides the advantage that considerably higher loads can be transmitted due to the fact that the bond is not subjected to mere shearing stresses.

According to another embodiment of the invention, the tie rod is provided with a bore widening in steps. Such a bore is also easy to produce and may have any number of steps, as suited for its particular application.

According to a preferred embodiment of a tie rod, the tie rod is cylindrical in shape, the bore extends coaxially and the outside of the tie rod is provided with an external thread. Such a tie rod transmits the forces to which it is subjected equally to the tension bar fixed in the coaxial bore. In addition, such a tie rod provides the advantage that, being fixed in a threaded bore, it enables the position of the component to be mounted to be adjusted simply by varying the length which the tie rod is screwed in. Handling of the tie rod is rendered possible in this case by an application surface for a tool which is provided on the outside of the rod. This surface may be used, for example, for applying a fork wrench for screwing the bolt-like tie rod into a blind bore.

According to another advantage embodiment, the tie rod is of multi-piece design, comprising an inner sleeve enclosing the tension means and an outer sleeve which surounds the inner sleeve and which is supported by the latter in axial direction. In the case of such a tie rod, the end of the tension means is bonded to the inner sleeve, whereas the outer sleeve is designed as freely movable component so that it can rotate freely relative to the inner sleeve, while supporting the latter in the axial direction. Thus, when the outer sleeve is fixed to the component to be fastened, for example by screwing, the screwing movements of the outer sleeve are not transmitted to the inner sleeve and, consequently, to the tie rod, whereby detrimental torsional stresses on the latter are avoided, while axial forces are transmitted to the tension means through the supporting contact and the inner sleeve.

The axial supporting contact between the outer and the inner sleeve is achieved advantageously thanks to the fact that the end of the inner sleeve adjacent the free end of the tension means is provided with a radially widening shoulder and that the outer sleeve is provided with a projection extending radially inwardly and engaging the shoulder from behind.

Preferably, the inner sleeve is made from a plastic material, in particular from the plastic material of the in which the glass fibers are embedded, while the outer sleeve consists of a metal, in particular of brass. This enables the tie rod to be fastened securely, for example in a threaded bore, and ensures a very strong surface bond between the inner sleeve and the tie rod, the materials of these parts having the same coefficient of expansion. Further, the adhesive is, preferably, an epoxy adhesive.

The method according to the invention solves the beforementioned problem by the fact that the ends of the glass fibers are stripped from plastic material at the ends of the tension means, that the ends of the glass fibers are then introduced into the bore of the tie rod until they project beyond the latter's enlarged end, that the ends of the glass fibers are spread in fanlike manner and provided with adhesive and then retracted into the bore and cured inside the latter.

According to this method, the glass fibers at the ends of glass fiber reinforced plastic bars are stripped so that they can be spread in fanlike manner, after they have been introduced into the bore of the tie rods, in order to increase the diameter of the glass fiber bundle, and after having been so spread the ends of the glass fibers are provided with an adhesive and then retracted into the tie rod until they are enclosed by the widening bore. The adhesive is then permitted to cure in this position, whereby the glass fiber ends are bonded to form a plug resting securely in the bore of the tie rod which tapers in the pulling direction.

In the case of Kevlar polyaramide strings, it is only necessary to spread the glass fibers, after the string has been passed through the bore of the tie rod, to cover them with adhesive and to retract them into the bore. It is not necessary in this case to strip the glass fiber ends previously from adhering plastic material.

According to a preferred embodiment of the invention, the spread-apart glass fiber ends may be additionally textured, crushed or deformed in a similar manner. Such additional deformation of the ends of the glass fibers acts additionally to prevent the plug fixed in the bore of the tie rod from being pulled out later.

Other advantages, features and details of the invention will become apparent from the following specification which describes certain embodiments of the invention in more detail with reference to the drawing.

DESCRIPTION OF THE PREFERRED EMBODIMENTS

Figure 1:
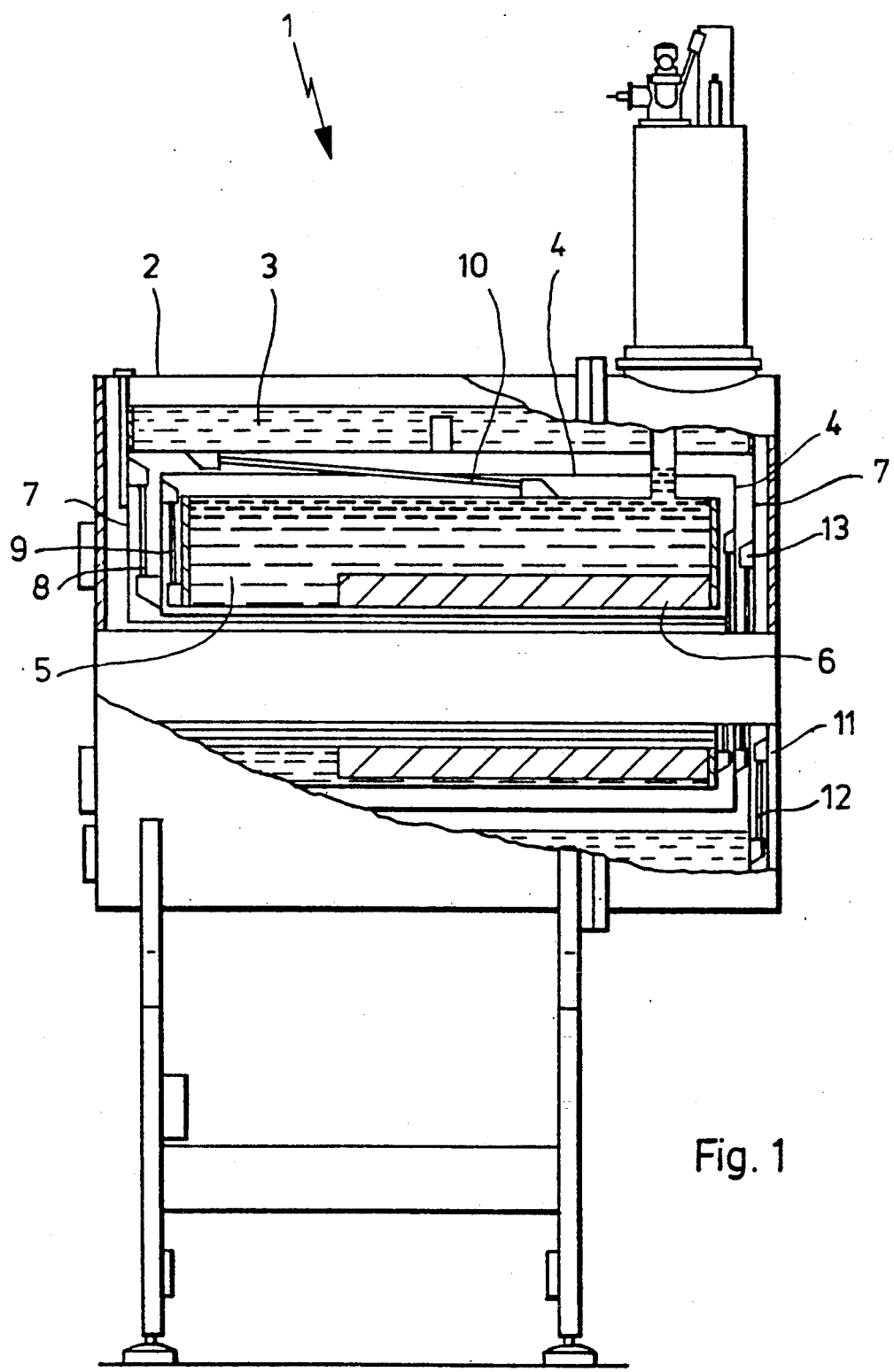
FIG. 1 shows a diagrammatic side view, partly cut, of a cryostat according to the invention.

The cryostat 1 illustrated in FIG. 1 is composed of a jacket 2 enclosing, viewed from the outside to the inside, a nitrogen tank 3, a shield 4 and a helium tank 5 which contains a superconductive magnet 6. The shield 4 is fixed to the end faces 7 of the nitrogen tank 3 by means of tension bars 8. Similarly, the helium tank 5 is fixed to the shield 4 by means of tie rods 9. Further, the helium tank 5 is connected to the nitrogen tank 3 by means of at least one tension bar 10 extending in axial direction. Finally, the nitrogen tank 3 is also fastened on the end faces 11 of the jacket 2 by tension bars 12. Each of the tension bars 8, 9, 10 and 12 is provided on its ends with connection areas 13 by which they are fixed on the component to be mounted.

Figure 2:
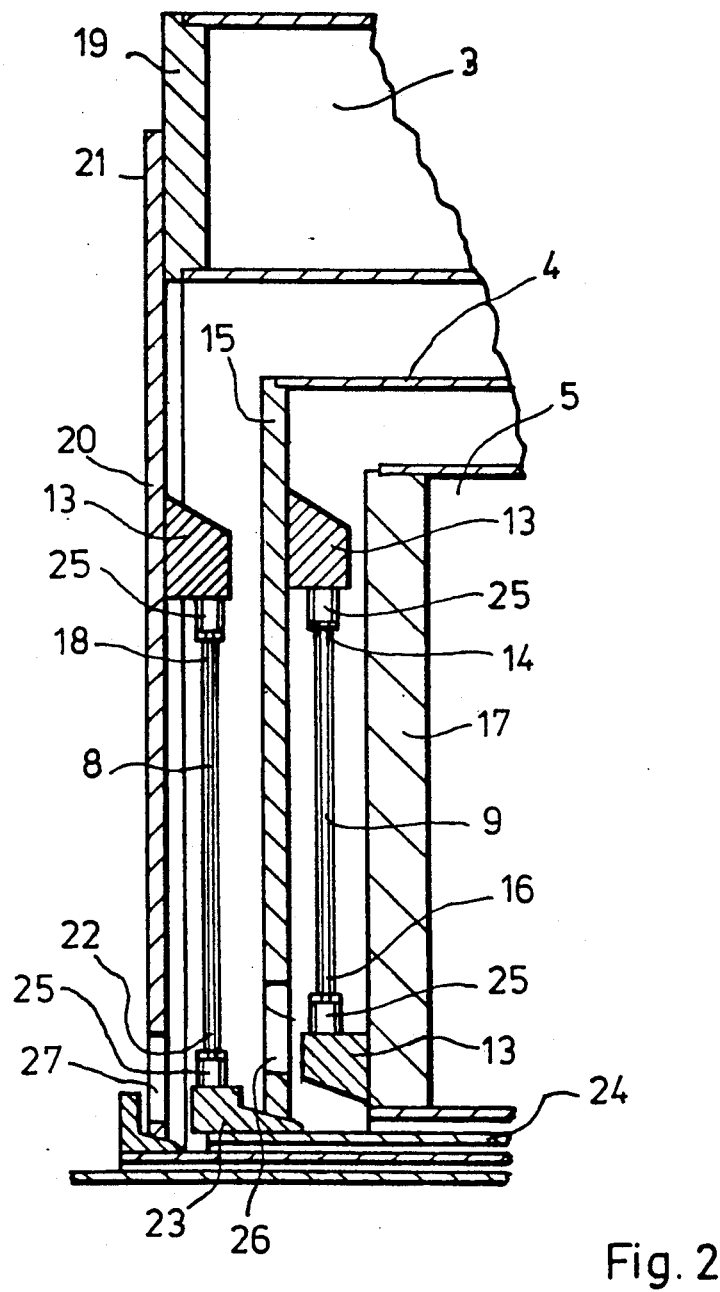
FIG. 2 shows a portion of a cryostat according to FIG. 1, in enlarged scale.

As can be seen best in FIG. 2, the tension bar 9 interconnecting the helium tank 5 and the shield 4 has its upper end 14 fixed on the inside of the end wall 15 of the radiation shield 4, via its connection area 13. Similarly, the lower end 16 of the tension bar 9 is fixed on the outside of the end wall 17 of the helium tank 5 by a connection area 13. The tension bar 8 interconnecting the radiation shield 4 and the nitrogen tank 3 is fastened in the same manner, except that the connection area 13 fixing the upper end 18 of the tension bar 8 is not directly fixed on the end wall 19 of the nitrogen tank 3, but rather on the end wall 20 whose outer rim 21 rests against the end wall 19 of the nitrogen tank 3. The lower end 22 of the tension bar 8 is fixed in a bearing piece 23 mounted on an inner jacket portion 24 of the shield 4.

The ends 14, 16, 18 and 22 of the tension bars 9 and 8 are fastened in the connection areas 13 or the bearing piece 23, respectively, by tie rods 25 arranged at the ends of the tension bars 8 and 9 and provided with an external thread by which they are screwed into matching threaded bores in the connection areas 13 and the bearing piece 23. During assembly of the cryostat 1, the tension bars 8 and 9 can be fixed on the inside of the respective outer component before the inner component is introduced, and finally the connection to the outside of the inner component can be made through a recess 26 or 27 provided in the outer component. The recesses 26 and 27 can be closed easily if this should be necessary.

Figure 3:
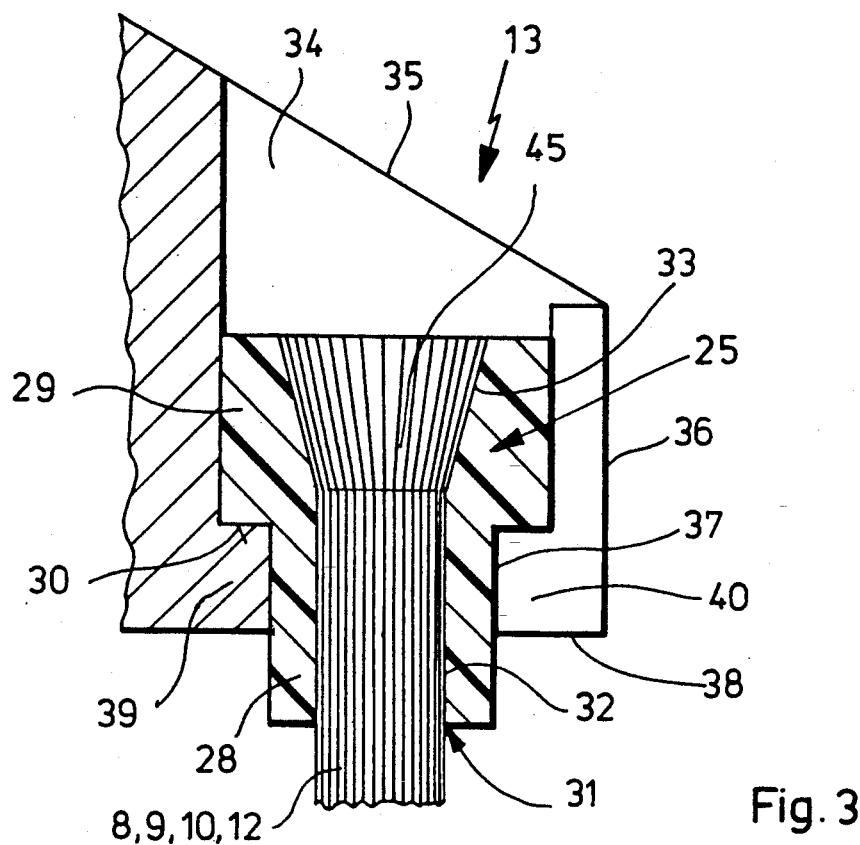
FIG. 3 shows a cross-section through one embodiment of a connection area of a tension bar, in further enlarged scale.

FIG. 3 shows an enlarged cross-sectional representation of one embodiment of a connection area 13 with a tie rod 25 retaining a tension bar fixed in place. The tie rod is cylindrical in shape and comprises a first cylindrical portion 28 of smaller diameter, as compared to the second cylindrical portion 29. The portion 28 and the portion 29 are separated by a shoulder 30. In addition, the tie rod 25 is provided with a bore indicated generally by 31. The bore 31 comprises a cylindrical portion 32 and an adjacent portion 33 widening conically towards the outside. The bore 31 accommodates the end of one of the tension bars 8, 9, 10 or 12. The end portion of the tension bar contained in the conically widening portion 33 exhibits a similarly enlarged cross-section, a circumstance which will be described in more detail further below. The tie rod 25 is accommodated in a recess 34 of the connection area 13, which is open towards the top 35 and towards one of its vertical sides 36 so that the tie rod 25 can be introduced into the recess 34 until the portion 28 of the tie rod 25 is received in a recess 37 provided in the bottom 38 of the connection area 13 in such a way that the projections 39 and 40 engage below the portion 29 of the tie rod 25 at the shoulder 30. The vertical side 36 is designed in such a way that it encloses part of the circumference of the tie rod 25 after the latter has been inserted into the recess 34. Consequently, the tie rod 25 is held securely in the recess 34 so that the tension bar is capable of transmitting forces via the connection area 13 to the component fixed thereon in a well defined manner.

Figure 4:
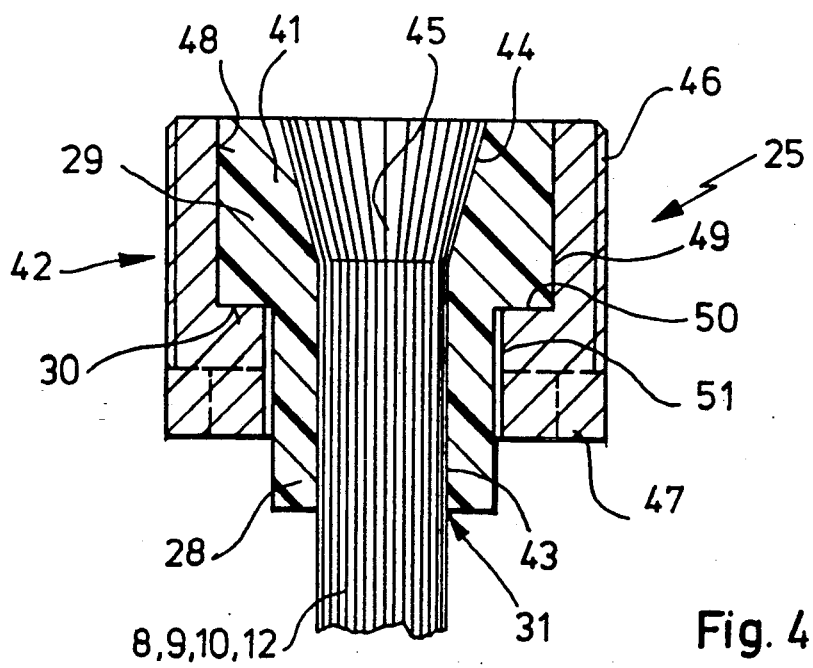
FIGS. 4 and 5 show a cross-section through certain examples of a tie rod.
Figure 5:
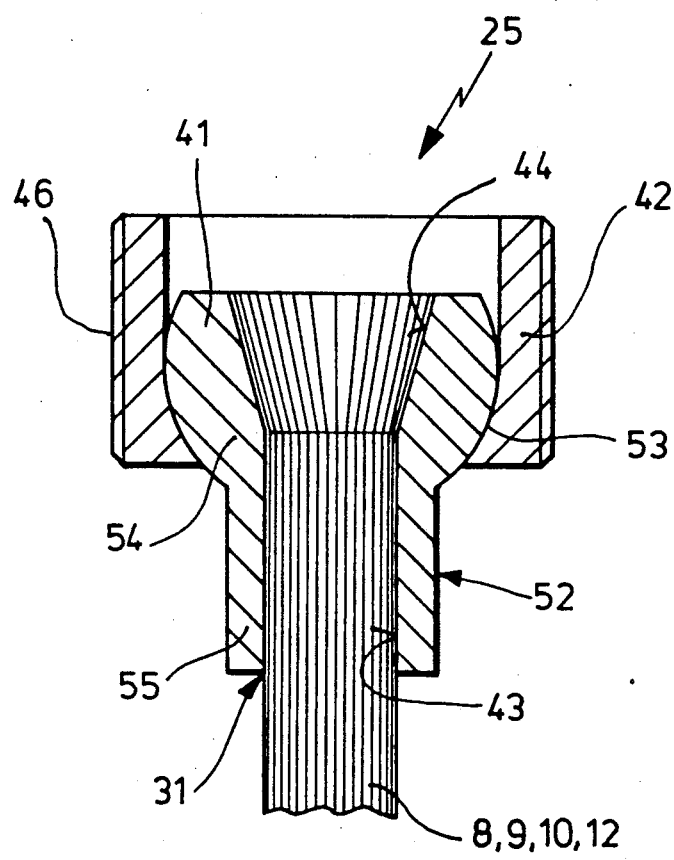

FIG. 4 shows a different embodiment of a tie rod 25 consisting of an inner sleeve 41 and an outer sleeve 42 embracing the inner sleeve 41 in coaxial arrangement. In the case of the tie rod 25 illustrated in FIG. 3, the inner sleeve 41 comprises a first cylindrical portion 28 and a second cylindrical portion 29 of larger diameter, as compared to the portion 28, the limit between the two sections being defined by a shoulder 30. The inner sleeve 41 comprises further a cylindrical bore 23 which is followed by a conically widening bore 44. The bores 43 and 44 accommodate the end 45 of one of the tension bars 8, 9, 10 or 12. The outer sleeve 42 enclosing the inner sleeve 41 is provided on its outside with an outer thread 46 extending over part of its axial length and with a surface 47 for the application of a tool, for example a hexagon head, extending over the remaining axial length of the outer surface of the outer sleeve 42, at the latter's end opposite the free end 45 of the tension bar. The shape of the bore 48 in the outer sleeve 42 is such that an area 49 of larger diameter is followed, via a shoulder 50, by an area 51 of smaller diameter, the diameter of the area 49 matching the diameter of the portion 29 of the inner sleeve 41, while the portion 28 of the inner sleeve 41 fits into the portion 51 with some play. The shoulders 30 and 50 are in contact with each other in this engaged position. Advantageously, the outer sleeve 42 is made from brass, while the inner sleeve 41 consists of a plastic material, preferably the same plastic material from which the plastic tension bar is made.

Now, when the tie rod 25 is screwed down into the threaded bore of the connection point 13, by means of a tool applied to the tool application surface 47, the position of the free end 45 of the tension bar relative to the connection area 13 can be adjusted exactly by proper selection of the screwing depth, it being understood that due to the two-part design of the tie rod the screwing movement is not transmitted to the inner sleeve 41 and, thus, to the tension bar.

The tie rod 25 illustrated in FIG. 15 is also of two-part design, but the inner sleeve 41 has the shape of a ball pin 52 made from metal while the outer sleeve 42 forms a ball socket 53 for the ball 54 of the ball pin 52. The ball 54 is followed by a cylindrical extension 55 matching the shape of the portion 28 and containing the cylindrical bore 43, whereas the ball 54 is provided with a conically widening bore 44. When the outer sleeve 42 is screwed down into a threaded bore of a connection area 13, by means of its outer thread 46, the forces of the connection area are, therefore, transmitted exclusively to the tension bar 8, 9, 10 or 12, in the axial direction.

Figure 6A:
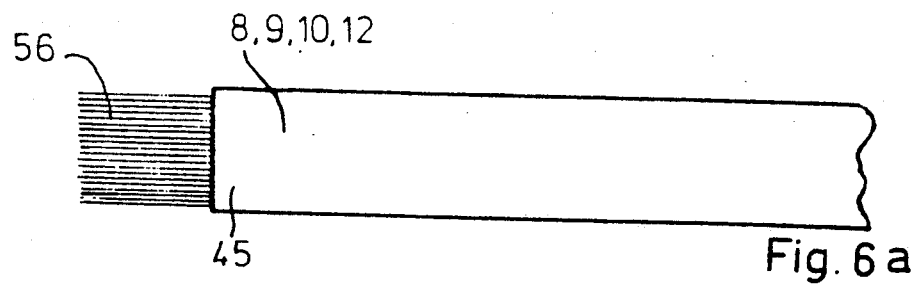
FIGS. 6 a-d illustrate diagrammatically four operating steps of the process of preparing the connection between a tension bar and a tie rod.
Figure 6B:
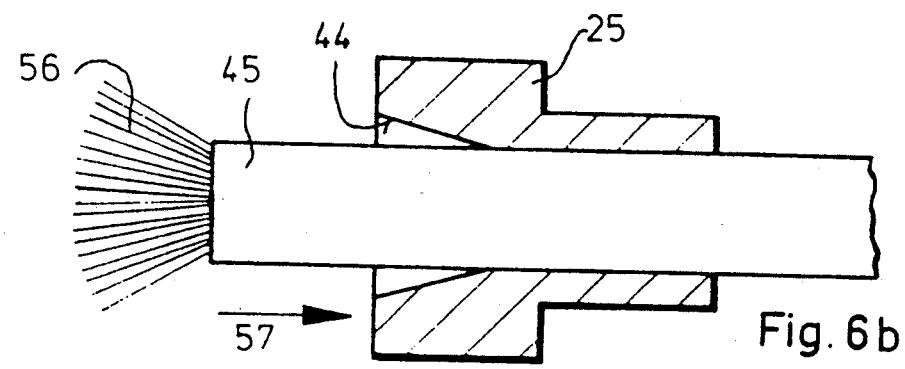
Figure 6C:
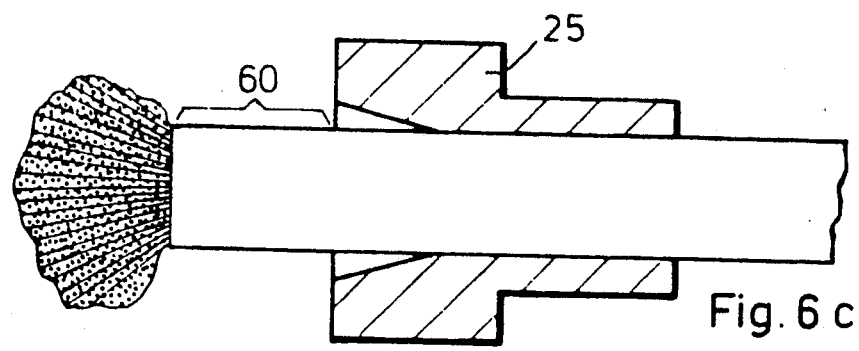
Figure 6D:
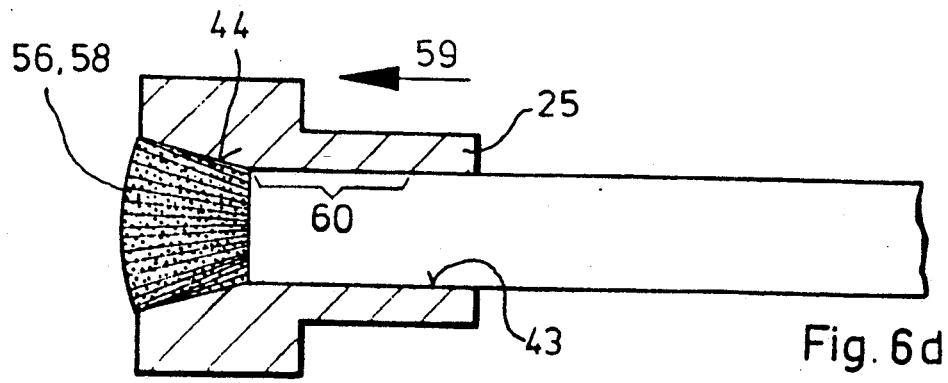

Hereafter, the different operations required for establishing a connection between one end of a tension bar 8, 9, 10 or 12 and a tie rod 25 will be described with reference to the diagrammatic representations of FIGS. 6 a to d. The end 45 of the tension bar is prepared by detaching and removing the resin from the directional glass fibers 56 so that the latter project axially from the plastic material of the tension bar. Instead of using the plastic bar reinforced by directional glass fibers as illustrated in FIG. 6, one may of course also use Kevlar polyaramide strings in which case the step of detaching and removing the resin can be omitted. As illustrated in FIG. 6b, the tie rod 25 is now pushed axially over the tension bar in the direction indicated by arrow 57 so that its conically widening bore 44 points toward the free end 45 of the tension bar and a certain distance exists between the tie rod 25 and the end 45. Thereafter, the glass fibers 56 projecting beyond the end 45 are spread up in fanlike manner. As an additional measure, the glass fibers may be curled, fused or deformed in some other manner. One then applies an adhesive 58, preferably an epoxy adhesive, as illustrated in FIG. 6c, which flows around and encloses fully the free ends of the glass fibers 56, whereafter the tie rod 25 is pushed in the direction of arrow 59, over the glass fibers 56 embedded in the adhesive 58 so that the spread-up ends of the glass fibers 56 are accommodated in the conically widening bore 44. As a supplementary measure, a certain length 60 of the circumferential area of the tension bar may also be provided with an adhesive, in which case an additional bond is achieved between the tension bar and the tie rod 25 due to the fact that this length 60 finally comes to lie within the cylindrical bore 53 of the tie rod 25. After curing of the adhesive 58, a durable and extremely strong bond is obtained between the tension bar and the tie rod 25, the bond being subjected to shearing stresses in the area of the length 60 while the adhesive 58 between the ends of the glass fibers 56 is likewise subjected to shearing forces and, additionally, to pressure forces, so that the glass fibers 56 are secured from being pulled off the adhesive 58 thanks to the action of a self-locking effect. Even if the bond should be damaged, the forces can still be absorbed over a certain length so that in case of damage the strength of the bond will not drop abruptly so as to give rise to uncontrolled positional changes of the tanks fixed in the cryostat 1 by means of the tension bars 8, 9, 10 and 12.

The reference numerals in the claims are not a limitation, but shall facilitate their understanding.

I claim:

1. A cryostat, for superconductive magnets, comprising different components nested in each other, one of them forming an outer shell and at least another one forming a tank arranged in the latter for receiving a coolant, and comprising further tension means for interconnecting each inner component with its respective adjacent outer component, the said tension means comprising plastic bars having reinforcing fibers and being equipped at their ends with tie rods by means of which they are fixed to the respective component, the ends of the tension means consisting of fibers stripped from plastic and being fixed in a conical bore arranged in the tie rod, wherein the ends of the said fibers forming the ends of the said tension means end at the end of the said tension means and are fixed, spread in fanlike manner, in the said bore of the said tie rod and adhesive embedded and cured between said fanlike spread fibers.

2. A cryostat according to claim 1, wherein the said tension means are designed as Kevlar strings.

3. A cryostat according to claim 1, wherein the said bore of the said tie rod widens conically to one side.

4. A cryostat according to claim 1, wherein the said bore of the said tie rod is cylindrical in shape over a first portion and widens up conically over the remaining portion.

5. A cryostat according to claim 1, wherein the said tie rod is provided with a bore widening in steps.

6. A cryostat according to claim 1, wherein the said tie rod is cylindrical in shape, the said bore extends coaxially and the outside of the said tie rod is provided with an external thread.

7. A cryostat according to claim 6, wherein the outside of the said tie rod is adapted to receive a tool.

8. A cryostat according to claim 1, wherein the said tie rod comprises an inner sleeve enclosing the tension means and an outer sleeve which surround the said inner sleeve and which is supported by the latter in axial direction.

9. A cryostat according to claim 8, wherein the end of the said inner sleeve adjacent the free end of the said tension means is provided with a radially widening shoulder and the said outer sleeve is provided with a projection extending radially inwardly and engaging the said shoulder from behind.

10. A cryostat according to claim 8, wherein the said inner sleeve has the same coefficient of expansion as the said tension means.

11. A cryostat according to claim 8, wherein the said inner sleeve is made from a plastic material, in particular from the plastic material of the tension means.

12. A cryostat according to claim 8, wherein the said outer sleeve consists of a metal.

13. A cryostat according to claim 1, wherein the said adhesive is an epoxy adhesive.

14. A cryostat according to claim 9, wherein the said tension means consists of a plastic material which is reinforced by unidirection glass fibers, the said bore of the said tie rod widens conically to one side, the said bore of the said tie rod is cylindrical in shape over a first portion and widens up conically over the remaining portion, the said tie rod is provided with a bore widening in steps, the said tie rod is cylindrical in shape, the said bore extends coaxially and the outside of the said tie rod is provided with an external thread, the outside of the said tie rod is provided with a surface adapted to receive a tool, the said inner sleeve has the same coefficient of expansion as the said tension means, the said inner sleeve is made from the plastic material of the tension means, the said outer sleeve consists of brass, the ends of the said fibers are embedded in an epoxy adhesive.

15. A cryostat, for superconductive magnets, comprising different components nested in each other, one of them forming an outer shell and at least another one forming a tank arranged in the latter for receiving a coolant, and comprising further tension means for interconnecting each inner component with its respective adjacent outer component, the said tension means comprising plastic bars having reinforcing fibers and being equipped at their ends with tie rods by means of which they are fixed to the respective component, the ends of the tension means consisting of fibers stripped from plastic and being fixed in a conical bore arranged in the tie rod, wherein the ends of the said fibers forming the ends of the said tension means end at the end of the said tension means and are fixed, spread in fanlike manner, in the said bore of the said tie rod and adhesive embedded and cured between said fanlike spread fibers, said fanlike spread being greater when said adhesive is applied, than following emplacement in said conical bore whereby said fibers are surrounded by adhesive when said fibers are in said bore.

* * * * *